Patented Mar. 19, 1929.

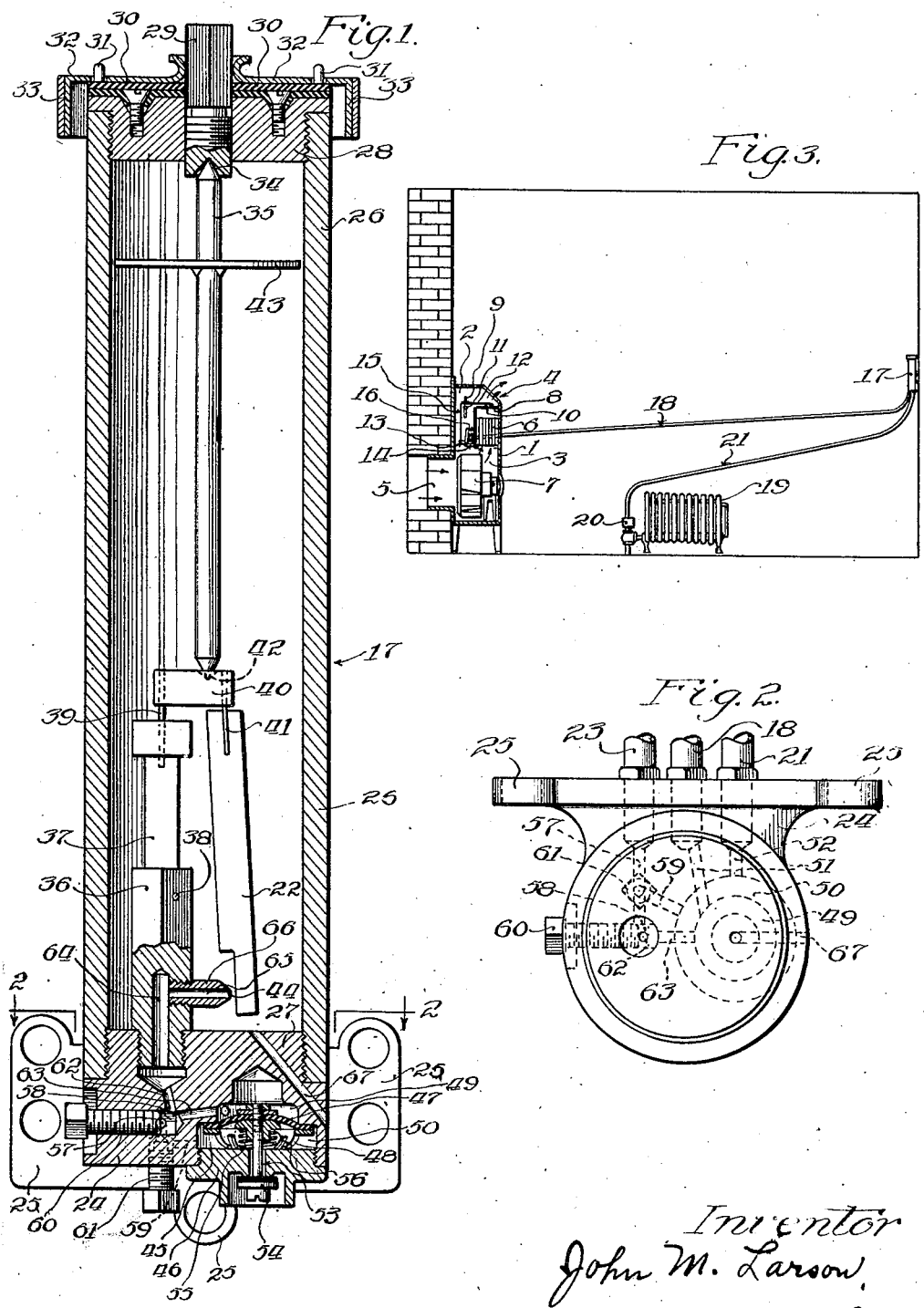

1,705,527

UNITED STATES PATENT OFFICE.

JOHN M. LARSON, OF CHICAGO, ILLINOIS, ASSIGNOR TO NATIONAL REGULATOR CO., OF CHICAGO, ILLINOIS, A CORPORATION OF ILLINOIS.

APPARATUS FOR CONTROLLABLY REGULATING TEMPERATURE.

Application filed October 8, 1926. Serial No. 140,231.

This invention relates to apparatus for controllably regulating temperature, and more specifically concerns combined thermostatic control of air conditioning and circulating apparatus and of heat-radiating units.

In providing for the automatic regulation of room temperature, it is important that proper allowance and provision be made for the introduction and circulation of fresh air during both moderate and extreme weather conditions, and a most important object of this invention is to provide means which may be conveniently adjusted or set at a selected thermometric degree; which will operate automatically to control a combination of individually controllable elements, in a novel manner to be described, to thereby effect and maintain the room temperature substantially uniform at the degree for which it is set and, at the same time, effect and regulate the conditioning and circulation of fresh air; which will so operate with a sufficiently wide range of controlling effects as to automatically allow and provide for radical changes in weather conditions and out-door temperature; and which is so constructed that it may be readily taken apart and re-assembled, if desired, for inspection or repairs, or for any other reason.

In the drawings—

Figure 1 is a vertical sectional view of an adjustable compound thermostatic controller constructed according to this invention;

Fig. 2 is a horizontal view of one end-member serving as the base of the controller, taken upon the line 2—2 of Fig. 1; and Fig. 3 is a somewhat diagrammatic view illustrating the controller of Fig. 1 controllably connected with an automatically adjustable air conditioning and circulating unit, which is shown in vertical section, and with an automatically controllable-supplemental or auxiliary heat-radiating unit, shown in elevation.

Thermostatically controlled heating systems are well known and, for obvious reasons, the type of such systems generally preferred embodies means for automatically controlling the admission of fresh, warmed air. Although some systems of this type possess many desirable qualifications, they do not usually operate satisfactorily under radical changes in weather conditions. Where they are sufficiently sensitive in operation to maintain, under normal or favorable weather conditions, a substantially uniform room temperature, their range of control is considerably limited and, due to the very principle upon which they operate, they are incapable of continuing to maintain the desired room temperature and at the same time provide a proper circulation of fresh air during abnormal weather conditions.

It is obvious that, during extremely cold weather, the admission of the colder fresh air requires a counter-acting increase in the heating facilities, if the admission and circulation of fresh air is to continue and the desired room temperature is to be maintained. These previously known systems operate, however, to automatically shut off the admission of outdoor air as the room temperature decreases, with the consequence that, during abnormally cold weather conditions, the circulation of fresh air is at first considerably restricted and finally entirely discontinued.

Now, it is also obvious that, if the room should be provided with additional heating facilities, they could be temporarily employed to assist in maintaining the desired room temperature and thereby allow a proportionately greater amount of the cold fresh air to be admitted. Manual adjustment of such additional heating facilities would require more or less constant attention, however, and it would be practically impossible, even with such attention, to so regulate them as to counteract the out-door changes in temperature with any such degree of uniformity and reliability as would insure the proper and satisfactory automatic regulation of the admission and circulation of fresh air.

This invention contemplates the use of such additional heating facilities and provides for their automatic control in direct combination with the automatic control of the conditioning and circulation of fresh air. An adjustable compound thermostatic controller is provided for the combined control of one or more automatically adjustable air conditioning and circulating units and of one or more automatically controllable supplemental or auxiliary heat-radiating units, one each of such units being illustrated in the drawings. Under normal or moderate weather conditions, wherein the thermostatic control of the air conditioning and circulating units is alone sufficient to maintain the desired room temperature and fresh air circulation, the supplemental or auxiliary heat-radiating units will not be required or employed, and a sensitive and graduated adjustment of the air conditioning and circulating units will obtain. However, the construction and operation of the compound thermostatic controller is such that a slight decrease in room temperature below the thermometric degree at which the controller is set will cause the supplemental or auxiliary heat-radiating units to be brought into service, and such service will be continued as long as required to assist the air conditioning and circulating units in restoring and maintaining room temperature. At the same time, the aforesaid sensitive and graduated adjustment of the air conditioning and circulating units will be continued and, when the room temperature has been sufficiently restored, this will also be automatically determined by the controller, and the additional heating service will be discontinued until again needed. It will thus be seen that, under abnormally cold weather conditions, wherein the thermostatic control of the air conditioning and circulating units is not alone sufficient to cope with the colder air admission and maintain the desired room temperature and fresh air circulation, the supplemental or auxiliary heat-radiating units will be automatically called upon to assist, so that the regulated conditioning and circulation of fresh air may be continued during radical changes in weather conditions and out-door temperature.

In order to give a better understanding of the purpose and use of the compound thermostatic controller, it may be well, before describing its construction and operation, to describe the automatically controllable elements which are connected therewith and controlled in operation thereby.

Referring, first, to Fig. 3, it will be seen that the air conditioning and circulating unit therein shown comprises a casing 1, the interior of which is divided into two communicating chambers, 2 and 3. The output chamber 2 constitutes a mixing chamber into which heated and unheated fresh air is controllably delivered from the intake chamber 3, and from which the thus conditioned fresh air passes into the room through the output opening 4. The intake chamber 3 is provided with a cold or fresh air inlet 5, and houses a heat-radiating unit 6 and an electrically driven suction-fan 7. In the drawings, the unit 6 represents a steam heated radiator, but, while this type of unit is preferred, a hot water or electrically heated unit could be used equally well in many instances. The purpose of the fan 7 is to provide a forced draft, when desired.

Dampers 8 and 9 are shown as pivotally supported at 10 and 11, respectively, and are operatively connected to each other, by the link 12, and to the operating lever 13 of a fluid-pressure motor 14, by the link 15. A spring 16 acts upon lever 13 to oppose the movement thereof by the expansion of motor 14. The motor 14 is connected to be controlled in operation by the compound thermostatic controller 17, through the control-conduit 18. Damper 8 controls the amount of air which is allowed to pass from chamber 3, through the heat-radiating unit 6, into chamber 2, and damper 9 controls the amount of air which is allowed to be by-passed around said unit 6, from chamber 3 into chamber 2. It will thus be seen that, with this arrangement, the adjustment of dampers 8 and 9 will control the mixture of heated and unheated fresh air delivered from the intake chamber 3 to the output chamber 2 and thence into the room through opening 4. In order to provide for a constant circulation of approximately the same volume of conditioned fresh air, dampers 8 and 9 are herein shown as so connected together by link 12 that, when damper 8 is wide open, damper 9 will be completely closed, and vice versa, but it is within the scope of this invention to so arrange or connect them that either may be wide open before the other begins to close. Furthermore, the relative sizes of the dampers may be different.

A separately placed, supplemental or auxiliary heat-radiating unit 19 is herein shown as a conventional steam heated radiator, but another type of heat-radiating unit could be substituted, if preferred. The supply of the heating medium to this unit 19 is controlled by a fluid-pressure motor located within the housing 20, which motor may be similar in construction and operation to the motor 14. This motor for controlling the supply of the heating medium to the heat-radiating unit 19 is connected to be controlled in operation by the controller 17, through the control-conduit 21.

It is to be understood that, while but one air conditioning and circulating unit and but one supplemental or auxiliary heat-radiating unit are herein shown, such a showing is for illustrative and explanatory purposes only. These units may be of different sizes and capacities and may be increased in number, either relatively or collectively, dependent upon various conditions which may exist, such, for example, as upon the size of the room and its location with respect to the direction of the prevailing winds. However, the number, size, and placement of the units are matters to be determined in the installation of the system and do not relate to the method of operation and control. It is sufficient, in this respect, to state that one or more of such units may be controlled by a single compound thermostatic controller.

It has been mentioned that the heat-radiating unit 6 represents a steam heated radiator and that the purpose of the fan 7 is to provide a forced draft, when desired. In addition, it may be stated that the supply of the heating medium to this unit 6 may be automatically controlled. However, so far as this description is concerned, the supply of the heating medium to the unit 6 may be considered as constant and the employment of the fan may be optional. Consequently, it appears to be unnecessary to illustrate the service connections to these elements, and they are not shown.

The operation of the parts thus far described is as follows. Alternate supply and release of fluid-pressure through conduits 18 and 21 will effect the corresponding expansion and collapse of motor 14 and the motor within housing 20, respectively. Such supply and release of fluid-pressure through said conduits is automatically controlled by the compound thermostatic controller 17 in a manner to be presently described, it being sufficient at this point to state that, when the controller 17 has been set to effect and maintain a desired degree of temperature, the automatic controlling operation thereof is such that decreases in temperature slightly below said degree will occasion a proportionately gradual increase in the supply of fluid-pressure to conduit 18 and, if such decrease in temperature continues to a predetermined further degree, fluid-pressure will be released from conduit 21. Conversely, if the temperature should increase slightly above the degree for which the controller has been set, a proportionately gradual decrease in the supply of fluid-pressure to conduit 18 will occur and, if such increase in temperature continues to a predetermined further degree, fluid-pressure will be supplied to conduit 21. The drawings show the motor 14 as collapsed and it is to be assumed that the motor within housing 20 is expanded. Dampers 8 and 9 are shown positioned so that the air conditioning and circulating unit will operate to supply the maximum amount of cool fresh air, and it is to be understood that the expansion of the motor within housing 20 has effected the shutting off of the heating medium from the supplemental unit 19, so that it is not in service. When the temperature of the room has decreased to a predetermined degree, fluid-pressure will be gradually supplied, as aforesaid, to conduit 18, and motor 14 will begin to be expanded thereby, moving lever 13, against the opposition of spring 16, to effect an opening movement of damper 8 and a closing movement of damper 9, through links 12 and 15, respectively, thus increasing the amount of air passed between the coils of heat-radiating unit 6 and decreasing the amount of air by-passed around said unit into chamber 2, and thence outwardly into the room through output opening 4. If, notwithstanding this automatic increase in the amount of heated air supplied by the air conditioning and circulating unit, the temperature of the room continues to decrease, fluid-pressure will be released, as aforesaid, from conduit 21, and the motor within housing 20 will collapse and permit the supply of the heating medium to the supplemental unit 19, and such unit will thus be brought into service to assist in the heating of the room. The collapse of the motor within housing 20 may be assisted by a spring (not shown) acting in a manner similar to the spring 16, but, where a steam heated radiator is employed, as shown here, it may be effected by the valve-opening pressure of the steam in the supply-pipe.

It is needless to describe, in detail, the return of the several parts to their positions as shown in the drawings, it being sufficient to explain that, when the temperature of the room has increased to a predetermined degree, fluid-pressure will be automatically released in the same gradual manner with which it was before supplied in conduit 18 through the operation of controller 17, and motor 14 will begin to collapse, such collapse being assisted by the action of spring 16, and the hereinbefore described movement of dampers 8 and 9 will be reversed, so that the amount of heated air delivered into chamber 2 and into the room will be decreased, while the amount of unheated air, by-passed around the heat-radiating unit 6, will be increased. If the temperature of the room continues to increase, fluid-pressure will again be supplied to conduit 21, and the motor within housing 20 will again be expanded and shut off the supply of the heating medium to supplemental unit 19, dispensing with its previously required assistance.

While, as hereinbefore stated, the employment of the fan 7 may be optional and does not form a part of this invention, it may be well to direct attention to the fact that the efficiency of the air conditioning and circulating unit may be augmented thereby. Both the air-heating and air-cooling functions of the unit may be materially increased by employing a forced draft. Furthermore, should the direction of the wind be such as to interfere with the proper intake of fresh outdoor air, the suction fan could be used to correct such a condition.

Referring, now, to Figs. 1 and 2, the compound thermostatic controller therein shown is the element indicated at 17 in Fig. 3. It comprises a single thermostatically actuated valve 22 which controls the supply and release of fluid-pressure to and from the two individual control-conduits 18 and 21. Fluid-pressure is supplied to the controller, through a supply conduit 23, from a source (not shown) which may be suitably constructed and located as preferred. Although the supply and release of fluid-pressure to and from the two conduits 18 and 21 is controlled by the single valve 22, such supply and release is effected gradually with respect to conduit 18 and positively with respect to conduit 21, the result being that the motor 14 (Fig. 3), connected with conduit 18, will be correspondingly expanded and collapsed gradually and proportionately with decreases and increases in room temperature, while the motor within housing 20, connected with conduit 21, will be correspondingly completely collapsed and completely expanded, without such graduated and proportionate movement, whenever the respective decreases and increases in room temperatures reach predetermined degrees.

An end-member, herein shown as a base 24, is provided with ears 25 by which the controller is secured in position, preferably upright upon the wall of the room at a point distant from the air conditioning and circulating units and the heat-radiating units which it is designed to operatively control. Supported upon base 24 is a tube 26 of material possessing a high coefficient of expansion. Tube 26 is internally threaded at each end-part thereof, one end being screwed upon a boss 27 of base 24 and the other fitted with an end-member, herein shown as a screw-plug 28, having a centrally arranged threaded orifice fitted with an adjusting screw 29. Any preferred means may be employed for adjusting the screw 29. As herein shown, the upper end-part of the screw is squared and operatively engaged by a circular steel wrench-plate 30, and wrench-plate 30 is provided with a pair of upstanding pins 31 which project through corresponding apertures in a superposed cap, or adjusting plate 32. Plate 32 is formed with a depending annular flange 33 suitable to be engaged by the fingers for adjustment and provided with a thermometric scale to be used for setting the controller for operation at different desired degrees of temperature.

The lower end of screw 29 is cupped at 34 to receive the upper pointed end of a rod 35, preferably formed of material possessing a low co-efficient of expansion. A post 36 is rigidly supported by base 24 to project upwardly within tube 26, and the upper end-part of this post is provided with a socket which receives the lower end-part of an extension-post 37, removably fixed in position by the pin 38. Secured to the upper end of extension-post 37, by the flat spring connection 39, is a short laterally extending lever 40, to the free end of which the depending valve 22 is connected by another flat spring connection 41. Between its ends, the upper surface of lever 40 is provided with a cup 42 which receives the lower pointed end of the rod 35. A guiding flange, such as the disc or spider 43 upon rod 35, facilitates the replacement of the upper pointed end of the rod in the screw-cup 34, if for any reason the tube 26 has been unscrewed and removed from base 24, or the plug 28 has been removed from the tube.

Changes in temperature will effect the longitudinal contraction and expansion of the tube 26. As viewed in Fig. 1, contraction of the tube, which will be occasioned by a decrease in temperature, will draw plug 28 toward base 24, forcing rod 35 downwardly upon lever 40 and thereby flexing spring connection 39 and moving valve 22 to cover the port 44. Conversely, expansion of the tube 26, which will be occasioned by an increase in temperature, will move plug 28 away from base 24, the downward pressure of rod 35 upon lever 40 will be gradually withdrawn, and spring connection 39 will raise lever 40 and move valve 22 gradually away from the port 44. The purpose of the flexible spring connection 41, by which valve 22 is attached to lever 40, is to permit a further contraction of tube 26 and movement of the intermediate parts to take place after valve 22 has been closed, without damage to, or disarrangement of, any of the connections. Under ideal working conditions, valve 22 will be maintained in a state of floating equilibrium over port 44, acting to control the amount of fluid-pressure allowed to escape therefrom and thus govern the degree of fluid-pressure supplied to conduit 18 in a manner to be presently more fully explained.

Within base 24, there is a downwardly opening, stepped, circular recess 45, which is closed by a centrally apertured screw-plug 46. A diaphragm 47 is tightly clamped by the spider-ring 48 upon an annular step or shoulder of the recess and divides it into two concentric chambers, 49 and 50, which are respectively connected by control-ducts 51 and 52 with conduits 18 and 21 (see Fig. 2). The central aperture 53 in screw-plug 46 leads from chamber 50 to the outer air and is controlled by a valve 54, which is formed with a slotted head and a threaded stem and is adjustably secured to the diaphragm 47, said stem being screwed into a pair of collars bearing tightly against opposite sides of said diaphragm. A cylindrically coiled spring 55 is arranged around the valve-stem and bears upwardly beneath a shoulder on the lower one (56) of said pair of collars, acting to raise diaphragm 47 and hold valve 54 normally closed over aperture 53. It is to be noted that valve 54 may be given more or less "play" and the compression of spring 55 may be adjusted by simply turning the slotted head of the valve. Furthermore, the entire valve-and-diaphragm structure may be removed as a unit by simply unscrewing and removing the screw-plug 46 from the recess 45.

A supply duct 57 extends from supply-conduit 23 and is connected with two passages 58 and 59, the connection with these passages being controlled, respectively, by adjustable needle-valves 60 and 61. Passage 58 connects with an outlet-duct 62 and a control-duct 63. Outlet-duct 62 leads to port 44, through a vertically extending passage 64, provided in the lower end-part of post 36, and a laterally extending outlet 65 in the nozzle 66. Control-duct 63 leads to the chamber 49 above diaphragm 47, and passage 59 leads directly to the chamber 50 below said diaphragm.

Needle-valve 60 is designed to be adjusted so that the amount of fluid-pressure permitted to pass to its respective ducts and passages, and to chamber 49 and conduit 18, will not equal the amount which valve 22, when fully open, will allow to escape from port 44 and thence, through outlet duct 67, to the outer air, and needle-valve 61 is likewise designed to be adjusted so that the amount of fluid-pressure permitted by it to pass to its respective duct and passage, and to chamber 50 and conduit 21, will not equal the amount which valve 54, when fully open, will allow to escape from outlet aperture 53 to the outer air.

The position of the parts as shown in the drawings indicates that the temperature of the room is slightly above the degree for which the thermostatic scale on the plate 32 of the controller 17 has been adjusted or set, with the result that tube 26 has expanded sufficiently to allow the movement of valve 22 to fully open port 44. Upon the supply of fluid-pressure through supply conduit 23 to supply-duct 57, a limited amount will pass needle-valve 61, through passage 59 to chamber 50, and thence through control-duct 52 to conduit 21. Valve 54 being held closed over the outlet aperture 53 by the action of spring 55, fluid-pressure will accumulate in chamber 50 and act upwardly upon diaphragm 47 to assist spring 55 in holding valve 54 in such closed position. Fluid pressure will also accumulate in control-duct 52 and conduit 21 and act upon the motor in housing 20 (Fig. 3) to shut off the heating medium from the supplemental heat-radiating unit 19, the speed with which said motor is expanded by the accumulating fluid-pressure being determined by the adjustment of needle-valve 61.

This pressure will be built up in the chamber 50 regardless of the fact that the outlet 44 may be open for the reason that the passage 59 branches off from the passage 57 ahead of the needle valve 60. The needle valve 60 prevents any appreciable diminution of pressure in the passage 57 due to the opening of the port 44.

A limited amount of fluid-pressure will also pass needle-valve 60, through passage 58, outlet-duct 62, passage 64, and outlet 65, to the open port 44, and from thence into tube 26 and through outlet-duct 67 to the outer air. With port 44 fully open, the fluid-pressure thus passing needle-valve 60 will escape to the outer air, and there will be no accumulation of pressure in control-duct 63 and chamber 49, nor will there be any accumulation of pressure in control-duct 51 and conduit 18. Consequently, motor 14 (Fig. 3) will remain collapsed, hot-air damper 8 will be closed and by-pass damper 9 will be open, all as shown in the drawings. It is therefore evident that, with the apparatus in service, when the temperature of the room has increased slightly above the desired degree, tube 26 will have expanded sufficiently to fully open port 44, and the effect thereof upon the automatically controllable devices connected with conduits 18 and 21 will be to hold the supplemental heat-radiating unit 19 out of service, and to place the air conditioning and circulating unit in its maximum air-cooling condition, excepting, of course, that the fan 7 may be employed to increase the intake and circulation of cool, fresh air.

The temperature of the room will now begin to decrease, tube 26 of the controller will correspondingly contract, and valve 22 will be thereby moved to gradually restrict the port 44. When this restriction reaches the point at which less fluid-pressure is allowed to escape, through port 44, from passage 58 than is being admitted to said passage past the needle-valve 60, pressure will begin to accumulate in said passage and also in outlet-duct 62, chamber 49, control-duct 51, and conduit 18. The first effect of this accumulation of pressure will be to begin the expansion of motor 14 and, consequently, the opening movement of hot-air damper 8 and the closing movement of by-pass damper 9. If the resultant increase in the amount of heated air circulated by the air conditioning and circulating unit does not arrest the decrease in room temperature, and the tube 26 continues to contract and further restrict port 44, such further restriction will effect a further increase in the degree of accumulated pressure and motor 14 will be further expanded, against the opposition of spring 16, and dampers 8 and 9 will be correspondingly further adjusted. This graduated and proportionate adjustment of the dampers of the air conditioning and circulating unit will continue as long as the room temperature continues to decrease until, when the tube 26 has effected the complete closing of valve 22 over port 44, the accumulated pressure acting upon motor 14 will be the full pressure supplied by supply-conduit 23 and motor 14 will have accomplished the full opening of hot-air damper 8 and the complete closing of by-pass damper 9.

The pressure which has been accumulating in conduit 18, with the aforesaid effects upon the dampers of the air conditioning and circulating unit, has been acting in chamber 49 with an increasing downward pressure upon diaphragm 47 but, until port 44 is almost or completely closed (dependent upon the adjustable resistance of spring 55), the escape of fluid-pressure therethrough has prevented a sufficient accumulation of pressure in chamber 49 to move the diaphragm against the combined opposing effect of spring 55 and the full degree of accumulated pressure in chamber 50.

It may here be explained that spring 55 is powerful enough to hold valve 54 closed over outlet aperture 53 when there is no pressure in chamber 50, but would not alone be capable of maintaining it closed as the pressure accumulated in said chamber and acted downwardly upon the valve to force it open. However, diaphragm 47 is attached to the valve-stem and the area of the diaphragm is so much greater than that of the aperture 53 that the valve-closing effect of the pressure in chamber 50 upon the diaphragm is far greater than the valve-opening effect thereof upon the valve itself, and the presence of any pressure whatever in said chamber therefore acts to assist to a far greater degree than it opposes the action of spring 55 in holding valve 54 closed.

It has been mentioned that the full degree of fluid-pressure is present in chamber 50. Now, when the pressure in chamber 49 has accumulated to the degree at which its downward action upon the diaphragm 47 plus the downward action of the pressure in chamber 50 upon valve 54 exceeds the opposing effect of the upward action upon said diaphragm of said pressure in chamber 50 plus that of spring 55, the valve will begin to open. When valve 54 has thus been opened far enough to allow more fluid-pressure to escape, through outlet apertures 53, from chamber 50 than is being admitted to said chamber past the needle-valve 61, the pressure in chamber 50 will be so weakened thereby that the accumulated pressure in chamber 49 will thereupon accomplish the full opening of the valve and the release of fluid-pressure from chamber 50 and from conduit 21.

The release of fluid-pressure from conduit 21 will permit the motor in housing 20 (Fig. 3) to be collapsed, in the manner already described, to admit the heating medium to supplemental unit 19, and both the air conditioning and circulating unit and the supplemental or auxiliary heat-radiating unit will then be acting at their maximum capacities to increase the room temperature. Attention is directed to the fact that the introduction and circulation of fresh air continues throughout the gradual and proportionate adjustment of the dampers of the air conditioning and circulating unit and still continues after the supplemental heating facilities have been brought into service.

The operation of the apparatus from its maximum temperature-reducing to its maximum temperature-increasing conditions having been described, it is hardly necessary to explain the reverse operation of said apparatus in complete detail. It is important to note, however, that in such reverse operation, the supplemental heating facilities are not dispensed with until a considerable re-adjustment of the dampers of the air conditioning and circulating unit has been effected and, since this provides the hereinbefore mentioned ideal working conditions, under which valve 22 will be maintained in a floating equilibrium over port 44, and constitutes a most important feature of this invention, it will be described.

It has been explained that, as the room temperature decreases below the desired degree, the apparatus first acts to arrest such decrease by automatically effecting a gradual and proportionate adjustment of the air-dampers of the air conditioning and circulating unit, and that it is only when such adjustment proves inadequate to meet the requirements that the supplemental or auxiliary heat-radiating unit is brought into service. It has also been mentioned that such service will be continued as long as required to assist in restoring and maintaining the desired room temperature. Now, with the additional room-heating facilities in service, the temperature will be materially increased, but it does not follow that the assistance thereof should be dispensed with as soon as this result is brought about, since it has already been automatically determined that the heat-producing qualifications of the air conditioning and circulating unit are not alone sufficient to arrest the decrease in room temperature, and it remains to be determined whether or not they are sufficient to maintain the desired temperature when again restored.

Returning, now, to the description and operation of the apparatus, and assuming that valve 22 holds port 44 completely closed, so that the full power of fluid-pressure is present in chamber 49 and conduit 18, while valve 54 is fully open, so that there is no accumulated pressure in chamber 50 and conduit 21, let it be further assumed that the combined heating effects of the air conditioning and circulating unit and the supplemental unit 19 are causing the room temperature to be increased. As tube 26 expands with such increase in temperature and as valve 22 is thereby gradually moved to open and increase the opening of port 44, the gradual increase in the amount of fluid-pressure thus allowed to escape progressively weakens the pressure which is present in chamber 49 and conduit 18. The first effect of this reduction of pressure will be to begin the collapse of motor 14 and, consequently, the closing movement of hot-air damper 8 and the opening movement of by-pass damper 9. At the same time, of course, the downward pressure exerted upon diaphragm 47 will be correspondingly reduced but, with valve 54 open, the pressure cannot accumulate in chamber 50 and act upwardly upon said diaphragm, and the result is that spring 55 is the only active force seeking to close valve 54. Spring 55 is not powerful enough to effect the closing of valve 54, however, as long as such action is opposed to any substantial degree by the downward action of the pressure in chamber 49 upon the diaphragm 47. As a consequence, the motor in housing 20 (Fig. 3) will remain collapsed and the supplemental unit 19 remain in service while the dampers 8 and 9 of the air conditioning and circulating unit are being gradually and proportionately adjusted to arrest the increase in temperature and, in some instances, this adjustment will provide the desired degree of temperature and maintain it by slight damper re-adjustments, without dispensing with the service provided by the additional room-heating facilities. Under such conditions, valve 22 would be maintained in the aforesaid state of floating equilibrium over port 44; the pressure in conduit 18 would be such as to hold motor 14 partially expanded; and the pressure in chamber 49 would not become sufficiently reduced to permit spring 55 to effect the closing of valve 54. In other instances, such, for example, if "over-sized" additional heating facilities were in service, the temperature of the room would continue to increase and effect the continued opening movement of valve 22 and the corresponding air-cooling adjustment of the aforesaid dampers. At the period in such opening movement of valve 22 when the amount of fluid-pressure allowed to escape from port 44 is substantially equal to the amount permitted to pass needle-valve 60, the pressure in chamber 49 and conduit 18 will have been reduced to a degree which will permit spring 55 to close the valve 54 and which will have allowed the substantially complete collapse of motor 14. As soon as valve 54 is closed, the fluid-pressure permitted to pass needle valve 61 begins to accumulate in chamber 50 and conduit 21, as hereinbefore described, holding valve 54 firmly closed over outlet aperture 53 and effecting the expansion of the motor in housing 20 and the shutting off of the heating medium to supplemental unit 19.

The latitude and effectiveness of the graduated control obtainable through the automatic operation of the dampers of the air conditioning and circulating unit are designed to be such that valve 22 of the controller 17 will be normally maintained in a floating equilibrium, as aforesaid, over port 44, at some point between its fully open and its completely closed positions, whether the supplemental heating facilities are required and are in service or whether they are not required and are not in service; that is to say, the additional heating facilities will not be brought into service unless required and will not be dispensed with unless not needed, but in either event, upon effecting or dispensing with such service, the valve will be returned to a balanced floating position over port 44 to effect the graduated and proportionate control of the position of the dampers as aforesaid.

While I have described but one embodiment of my invention, it is obvious that many modifications therein may occur to those skilled in the art, and I desire, therefore, that my invention be limited only by the scope of the appended claims and by the prior art.

I claim:

1. A compound thermostatic controller having a fluid-pressure inlet and first and second fluid-pressure actuators, separate ducts leading from said inlet to each of said actuators, and automatically actuable means operating, upon actuation in one direction, to increase the degree of fluid-pressure supplied to said first actuator and then decrease the degree of fluid-pressure supplied to said second actuator, and, upon actuation in the reverse direction, to decrease the degree supplied to said first actuator and then increase the degree supplied to said second actuator.

2. A thermostatic controller comprising a thermally expansible and contractible tube, a member secured to one end-part of said tube, a fluid-pressure supply-conduit and a plurality of fluid-pressure control-conduits connected with said member, a supply-duct and a plurality of control-ducts in said member connected respectively with said supply-conduit and said control-conduits, passages individually connecting said supply-duct with said control-ducts, individually adjustable means restricting the passage of fluid-pressure from said supply-duct to each of said passages, outlet-ducts individually connected with a first and a second of said passages and terminating in first and second outlet-ports, respectively, a first valve actuated by the expansion and contraction of said tube to effect a proportionately graduated control of said first outlet-port, a second valve controlling said second outlet-port, a fluid-pressure actuable diaphragm operatively associated with said second valve, a chamber of which said diaphragm forms a flexible wall, and a passage connecting said chamber with said first of said passages.

3. A thermostatic controller comprising a thermally expansible and contractible tube, a member secured to one end-part of said tube, a fluid-pressure supply-conduit and a plurality of fluid-pressure control-conduits connected with said member, a supply-duct and a plurality of control ducts in said member connected respectively with said supply-conduit and said control-conduits, passages individually connecting said supply-duct with said control-ducts, individually adjustable means restricting the passage of fluid-pressure from said supply-duct to each of said passages, outlet-ducts individually connected with a first and a second of said passages and terminating in first and second outlet-ports, respectively, a first valve actuated by the expansion and contraction of said tube to effect a proportionately graduated control of said first outlet-port, a second valve controlling said second outlet-port and normally holding it closed, a pressure-chamber and a passage connecting it with said first of said passages, and a diaphragm forming a flexible wall of said pressure-chamber and actuated by the accumulation of fluid-pressure in said first of said passages to operate said second valve to open said second outlet-port.

4. A thermostatic controller comprising a thermally expansible and contractible tube, a member secured to one end-part of said tube, a fluid-pressure supply-conduit and a plurality of fluid-pressure control-conduits connected with said member, a supply-duct and a plurality of control-ducts in said member connected respectively with said supply-conduit and said control-conduits, passages individually connecting said supply-duct with said control-ducts, individually adjustable means restricting the passage of fluid-pressure from said supply-duct to each of said passages, outlet-ducts individually connected with a first and a second of said passages and terminating in first and second outlet-ports, respectively, a first valve actuated by the expansion and contraction of said tube to effect a proportionately graduated control of said first outlet-port, a second valve controlling said second outlet-port, a pair of pressure-chambers and a fluid-pressure actuable diaphragm forming a flexible wall between said pressure-chambers, said pressure-chambers being individually connected with said first and second of said passages and said diaphragm being operatively associated with said second valve; whereby the operation of said second valve is influenced by the differentials in the degrees of fluid-pressure existing in said first and second of said passages.

5. A thermostatic controller comprising a thermally expansible and contractible tube, a member secured to one end-part of said tube, a fluid-pressure supply-conduit and a plurality of fluid-pressure control-conduits connected with said member, a supply-duct and a plurality of control-ducts in said member connected respectively with said supply-conduit and said control-conduits, passages individually connecting said supply-duct with said control-ducts, individually adjustable means restricting the passage of fluid-pressure from said supply-duct to each of said passages, outlet-ducts individually connected with a first and a second of said passages and terminating in first and second-outlet-ports, respectively, a first valve actuated by the expansion and contraction of said tube to effect a proportionately graduated control of said first outlet-port, a second valve controlling said second outlet-port, a pair of pressure-chambers and a fluid-pressure actuable diaphragm forming a flexible wall between said pressure-chambers, said pressure chambers being individually connected with said first and second of said passages and said diaphragm being operatively associated with said second valve, and a spring located in one of said pressure-chambers and acting upon said second valve to hold it normally closed over said second outlet-port; whereby the accumulation of fluid-pressure in said second of said passages will act upon said diaphragm and thereby assist said spring in holding said second valve closed, and whereby the accumulation of fluid-pressure in said first of said passages will act upon said diaphragm to counteract the effect thereupon of the fluid-pressure in said second of said passages, and said second valve will be forced open against the opposition of said spring.

6. A thermostatic controller comprising a fluid-pressure supply-conduit and a plurality of fluid-pressure control-conduits, a supply-duct and a plurality of control-ducts connected respectively with said supply-conduit and said control-conduits, passages individually connecting said supply-duct with said control-ducts, individually adjustable means restricting the passage of fluid-pressure from said supply-duct to each of said passages, outlet-ducts individually connected with a first and a second of said passages and terminating in first and second outlet-ports, respectively, a first valve controlled thermostatically to effect a proportionately graduated control of said first outlet-port, a second valve controlling said second outlet-port, a fluid pressure actuable diaphragm operatively associated with said second valve, a chamber of which said diaphragm forms a flexible wall, and a passage connecting said chamber with said first of said passages.

7. A thermostatic controller comprising a fluid-pressure supply-conduit and a plurality of fluid-pressure control-conduits, a supply-duct and a plurality of control ducts connected respectively with said supply-conduit and said control-conduits, passages individually connecting said supply-duct with said control-ducts, individually adjustable means restricting the passage of fluid-pressure from said supply-duct to each of said passages, outlet-ducts individually connected with a first and a second of said passages and terminating in first and second outlet-ports, respectively, a first valve controlled thermostatically to effect a proportionately graduated control of said first outlet-port, a second valve controlling said second outlet-port and normally holding it closed, a pressure-chamber and a passage connecting it with said first of said passages, and a diaphragm forming a flexible wall of said pressure-chamber and actuated by the accumulation of fluid-pressure in said first of said passages to operate said second valve to open said second outlet-port.

8. A thermostatic controller comprising a fluid-pressure supply-conduit and a plurality of fluid-pressure control-conduits, a supply-duct and a plurality of control-ducts connected respectively with said supply-conduit and said control-conduits, passages individually connecting said supply-duct with said control-ducts, individually adjustable means restricting the passage of fluid-pressure from said supply-duct to each of said passages, outlet-ducts individually connected with a first and a second of said passages and terminating in first and second outlet-ports, respectively, a first valve controlled thermostatically to effect a proportionately graduated control of said first outlet-port, a second valve controlling said second outlet-port, a pair of pressure-chambers and a fluid-pressure actuable diaphragm forming a flexible wall between said pressure-chambers, said pressure-chambers being individually connected with said first and second of said passages and said diaphragm being operatively associated with said second valve whereby the operation of said second valve is influenced by the differentials in the degrees of fluid-pressure existing in said first and second of said passages.

9. A thermostatic controller, comprising a fluid-pressure supply-conduit and a plurality of fluid-pressure control-conduits, a supply-duct and a plurality of control-ducts connected respectively with said supply-conduit and said control-conduits, passages individually connecting said supply-duct with said control-ducts, individually adjustable means restricting the passage of fluid-pressure from said supply-duct to each of said passages, outlet-ducts individually connected with a first and a second of said passages and terminating in first and second outlet-ports, respectively, a first valve controlled thermostatically to effect a proportionately graduated control of said first outlet-port, a second valve controlling said second outlet-port, a pair of pressure-chambers and a fluid-pressure actuable diaphragm forming a flexible wall between said pressure-chambers, said pressure chambers being individually connected with said first and second of said passages and said diaphragm being operatively associated with said second valve, and a spring located in one of said pressure-chambers and acting upon said second valve to hold it normally closed over said second outlet-port whereby the accumulation of fluid-pressure in said second of said passages will act upon said diaphragm and thereby assist said spring in holding said second valve closed, and whereby the accumulation of fluid-pressure in said first of said passages will act upon said diaphragm to counteract the effect thereupon of the fluid-pressure in said second of said passages, and said second valve will be forced open against the opposition of said spring.

10. A thermostatic construction for controlling two fluid-pressure motors, comprising an air passage for communication with the pressure supply, two restricted branch passages leading from said pressure passage, an exhaust port and a passage leading to one of said pressure motors, both said exhaust port and said passage being in communication with one of said branch passages whereby when said exhaust port is closed said pressure motor will be expanded and whereby when said exhaust port is open said pressure motor will be exhausted, a thermostatic valve for controlling said exhaust port, another exhaust port and a passage leading to the other pressure motor, both said other exhaust port and said passage being in communication with the other of said branch passages, whereby when said exhaust passage is closed said pressure motor will be expanded and whereby when said exhaust port is open said pressure motor will be exhausted, and a motor device controlled by the pressure in said one of said branch passages for controlling the exhaust from the exhaust port for said other of said branch passages.

In witness whereof, I have hereunto subscribed my name.

JOHN M. LARSON.